United States Patent [19]
Mullin et al.

[11] Patent Number: 5,811,946
[45] Date of Patent: Sep. 22, 1998

[54] SYSTEM AND METHOD FOR VELOCITY CONTROL OF A D.C. MOTOR

[75] Inventors: Eugene T. Mullin, Phoenixville; Clifford J. Bader, West Chester, both of Pa.

[73] Assignee: Lockheed Martin Corporation, Bethesda, Md.

[21] Appl. No.: 485,651

[22] Filed: Jun. 7, 1995

Related U.S. Application Data

[63] Continuation of Ser. No. 851,634, Mar. 16, 1992, abandoned.

[51] Int. Cl.⁶ .................................................. H01K 23/00
[52] U.S. Cl. ......................... 318/254; 388/811; 388/901; 388/928.1
[58] Field of Search .................................. 318/254, 439, 318/138; 388/809–815, 901, 928.1

[56] References Cited

U.S. PATENT DOCUMENTS

| | | | |
|---|---|---|---|
| 2,568,406 | 9/1951 | Packer et al. | 324/545 |
| 3,045,177 | 7/1962 | Weed | 324/546 |
| 3,769,576 | 10/1973 | Norkaitis | 324/546 |
| 3,869,664 | 3/1975 | Safer et al. | 324/546 |
| 4,266,168 | 5/1981 | Andersen | 318/86 X |
| 4,292,574 | 9/1981 | Sipin et al. | |
| 4,300,081 | 11/1981 | Van Landingham | 324/177 |
| 4,338,555 | 7/1982 | Rhodes | 318/561 |
| 4,422,040 | 12/1983 | Raider et al. | 318/490 |
| 4,547,723 | 10/1985 | McLellan | 324/546 |
| 4,574,225 | 3/1986 | Pershall et al. | 318/696 |
| 4,682,103 | 7/1987 | DeNardis | 324/158 MG |
| 4,736,142 | 4/1988 | Waymine | |
| 4,743,848 | 5/1988 | Krimm et al. | 324/158 MG |
| 4,857,814 | 8/1989 | Duncan | 318/443 X |
| 4,859,921 | 8/1989 | Archer | 318/138 X |
| 4,928,043 | 5/1990 | Plunkett | 318/254 |
| 4,965,513 | 10/1990 | Haynes et al. | 324/158 MG |
| 4,967,123 | 10/1990 | Lebsock | 324/158 MG |
| 4,996,477 | 2/1991 | Keeler et al. | 324/158 MG |
| 5,030,917 | 7/1991 | Kliman | 324/158 MG |
| 5,049,815 | 9/1991 | Kliman | 324/158 MG |
| 5,268,623 | 12/1993 | Muller | 318/434 |
| 5,352,963 | 10/1994 | Garand et al. | 318/696 |
| 5,612,629 | 3/1997 | Mullen et al. | 324/772 |

OTHER PUBLICATIONS

Webster's II New Riverside University Dictionary 1984, pp. 637 and 1004.

K. J. Astrom and B. Wittenmark, *Computer Controlled Systems: Theory and Design* (Prentice–Hall, Englewood Cliffs, New Jersey, 1984), pp. 20, 21, 30, 31, 60, 66, 67, and 187.

*IEEE Standard Dictionary of Electrical and Electronics Terms* (IEEE, 1984), p. 630.

L. C. Shen and J. A. Kong, *Applied Electromagnetism* (Brooks/Cole Engineering Division, Monterey, California, 1983), pp. 396–397.

B. C. Kuo, *Automatic Control Systems*, 5th ed. (Prentice–Hall, Englewood Cliffs, New Jersey, 1987), pp. 166–172.

A. V. Oppenheim and R. W. Schafer, *Digital Signal Processing* (Prentice–Hall, Englewood Cliffs, New Jersey, 1975), pp. 26–27.

Article by L. A. Berardinis entitled Good Motors Get Even Better in Machine Design dated Nov. 21, 1991, pp. 71–75.

*Primary Examiner*—David S. Martin
*Attorney, Agent, or Firm*—Stanton D. Weinstein; Harry F. Smith; Allan Ratner

[57] ABSTRACT

A system and method is disclosed for feedback velocity control of a D.C. motor. The system includes a motor (30) which is represented by its circuit equivalent—a series combination of an inductance (32), a resistor (34) and a back EMF source (36). The drive to the motor (30), supplied by a controller, is periodically inhibited by timing logic (22) and AND gate (20). Once the inductive transient decays via clamping diode (38) such that the motor current is zero, switch (40) is closed and the internally generated motor voltage is sampled by a capacitor (42). A/D converter (44) transforms the sampled value to a digital value and sends it to the controller. The controller compares it to a predetermined desired value then makes the necessary adjustments to the drive signal.

34 Claims, 5 Drawing Sheets

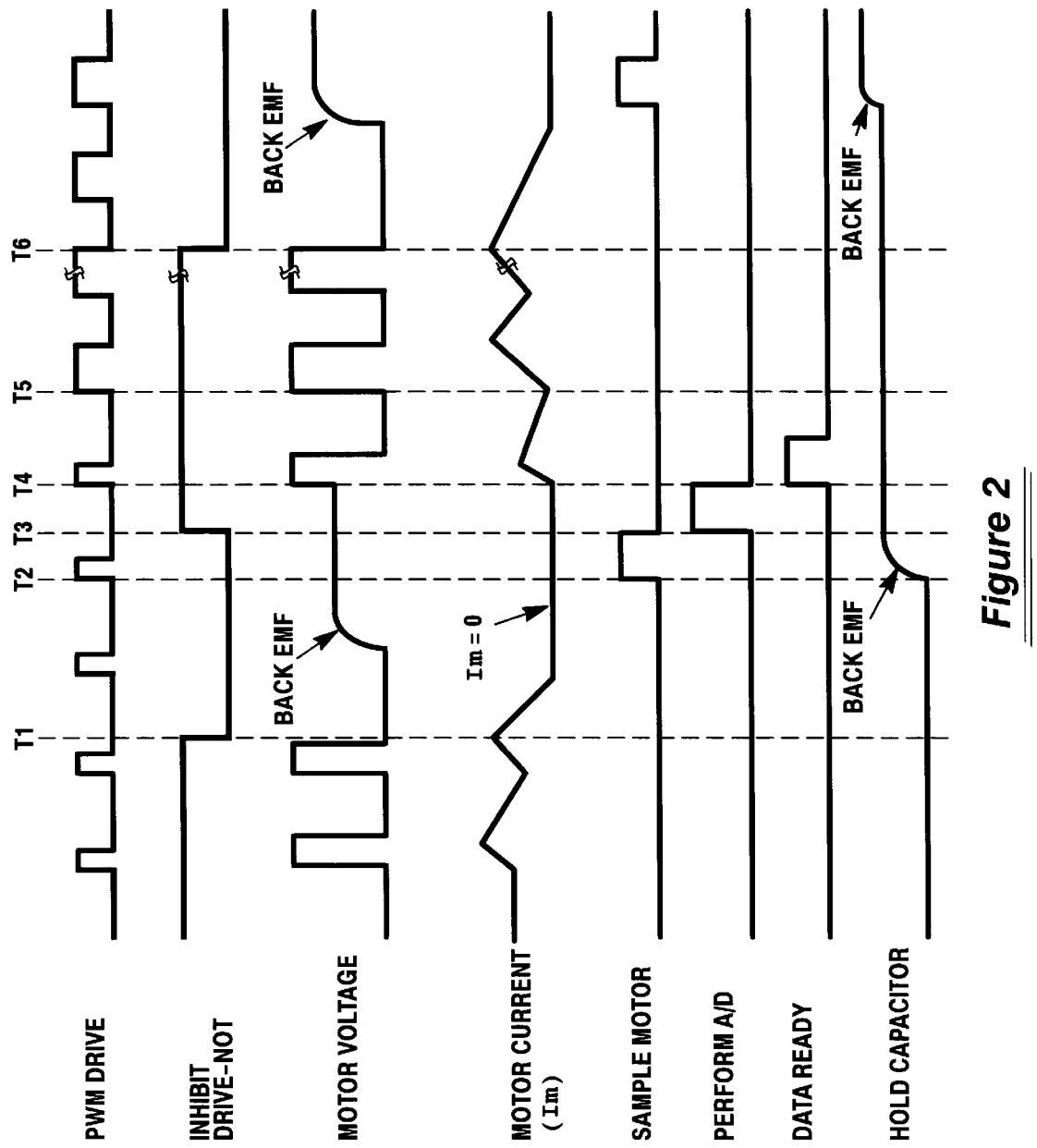

SYSTEM AND METHOD FOR VELOCITY CONTROL OF A D.C. MOTOR

This application is a continuation, of application Ser. No. 07/851,634, filed Mar. 16, 1992, now abandoned.

FIELD OF THE INVENTION

The present invention relates generally to feedback control systems for D.C. motors and, more particularly, to a velocity feedback control system for D.C. motors.

BACKGROUND OF THE INVENTION

In a feedback control system for controlling the velocity of a D.C. motor, an electrical signal corresponding to the actual motor velocity is needed for comparison with a value corresponding to the desired motor velocity. This signal is commonly obtained from a small tachometer generator attached to the motor shaft. An alternate approach for obtaining this signal is the use of a shaft encoder which produces digital pulses at a rate proportional to the velocity.

Both of the above approaches require that, in addition to the leads which power the motor, feedback signal leads be run from the motor location to the control electronics location. This requirement presents difficulties in a system where motors operate while in motion as part of a traveling assembly. For example, two-rail systems with sliding collective brushes are used to power a travelling motor or motors, but additional rails are necessary for the feedback signals. The additional rails add considerably to the expense of the system, and degrade its reliability because of added contact and electrical noise problems.

An alternative technique relies on the fact that DC motors are reversible machines which can serve as generators and generate back electromotive force (EMF). Back EMF is an internally generated voltage in the motor caused by the rotation of the armature. This is to be distinguished from an induced voltage which is the result of current changes flowing in the motor windings. It is possible to use this back EMF as a velocity indication. However, the terminal voltage of the motor, under powered conditions, is greater than the back EMF due to the voltage drops produced by the armature winding resistance and external lead resistance and the brush resistance in brush type DC motors. Furthermore, in control systems which use pulse-width modulation (PWM) to control the velocity, the motor voltage during the active pulse period is independent of the velocity.

It is possible to derive the back EMF, and hence the velocity, if the armature current and the various resistances are known. The associated IR drop can be calculated and subtracted from the terminal voltage by either analog or digital means. However, this method presents some formidable difficulties. First, the armature resistance is temperature dependent; copper has a temperature coefficient of about 0.4% per degree Centigrade. Since winding temperature rises of 100 degrees Centigrade are common in modern motors, the armature resistance can vary by 40% or more depending on load conditions and on ambient temperature.

Additionally, since brushes in brush-type DC motors generally contain carbon, the brush resistance changes with current and the voltage/current relationship becomes non-linear. In pulse-width modulated control systems, the current may exhibit significant variation over the pulse interval and this variation must also be taken into account.

Finally, the magnetic flux generated by the armature current alters the reluctance of the magnetic paths in the motor and thus causes the voltage/velocity coefficient to change. It can be seen that the achievement of an accurate velocity value using this method is a formidable task.

A related technique for velocity control is taught by U.S. Pat. No. 4,266,168 (Andersen) which relies on a method of measuring the motor current and correcting the applied voltage by an amount equal to the product of the measured motor current and an assumed value of the motor resistance. However, as already stated the value of resistance varies from motor to motor and also depends on the temperature of the armature winding making it difficult to achieve accurate compensation.

In order to improve the accuracy of the compensation, Andersen periodically samples the applied voltage, the back EMF, and the motor current. A more accurate determination of the motor resistance can thus be obtained by subtracting the back EMF from the applied voltage and dividing by the motor current. In this way Andersen adjusts the approximation of the motor resistance at intervals which are long compared to the control loop time constant.

The Andersen approach is complex and does not provide a real-time solution for controlling the motor velocity by using the back EMF.

It is an object of the present invention to provide a velocity feedback control system which operates accurately and efficiently in real time using direct measurement of the back EMF.

SUMMARY OF THE INVENTION

A system and method for controlling, in real time, the velocity of a D.C. motor which includes an adjustable voltage source, timing and control circuitry for periodically inhibiting the adjustable voltage source from applying voltage to the motor, a circuit (typically a switch and a hold capacitor) for sampling the internally generated motor voltage, a circuit for comparing this sampled value with a predetermined desired value and a controller for varying the adjustable voltage source in response to the comparison.

BRIEF DESCRIPTION OF THE DRAWINGS

The invention is best understood from the following detailed description when read in connection with the accompanying drawings, in which:

FIG. 2 shows the waveforms present, during operation, at various locations of the system in FIG. 1;

DETAILED DESCRIPTION

The present invention involves a system and technique for providing velocity feedback control for a D.C. motor. It should be noted that in the exemplary embodiment of the present invention brush-type D.C. motors are used. It works by time-multiplexing the motor leads: most of the time the motor leads are used to deliver voltage to the motor, however, periodically this delivered voltage is inhibited and the leads are used to measure the internally generated motor voltage. This measured voltage, known as back EMF, provides the feedback for velocity regulation.

Figure 1:
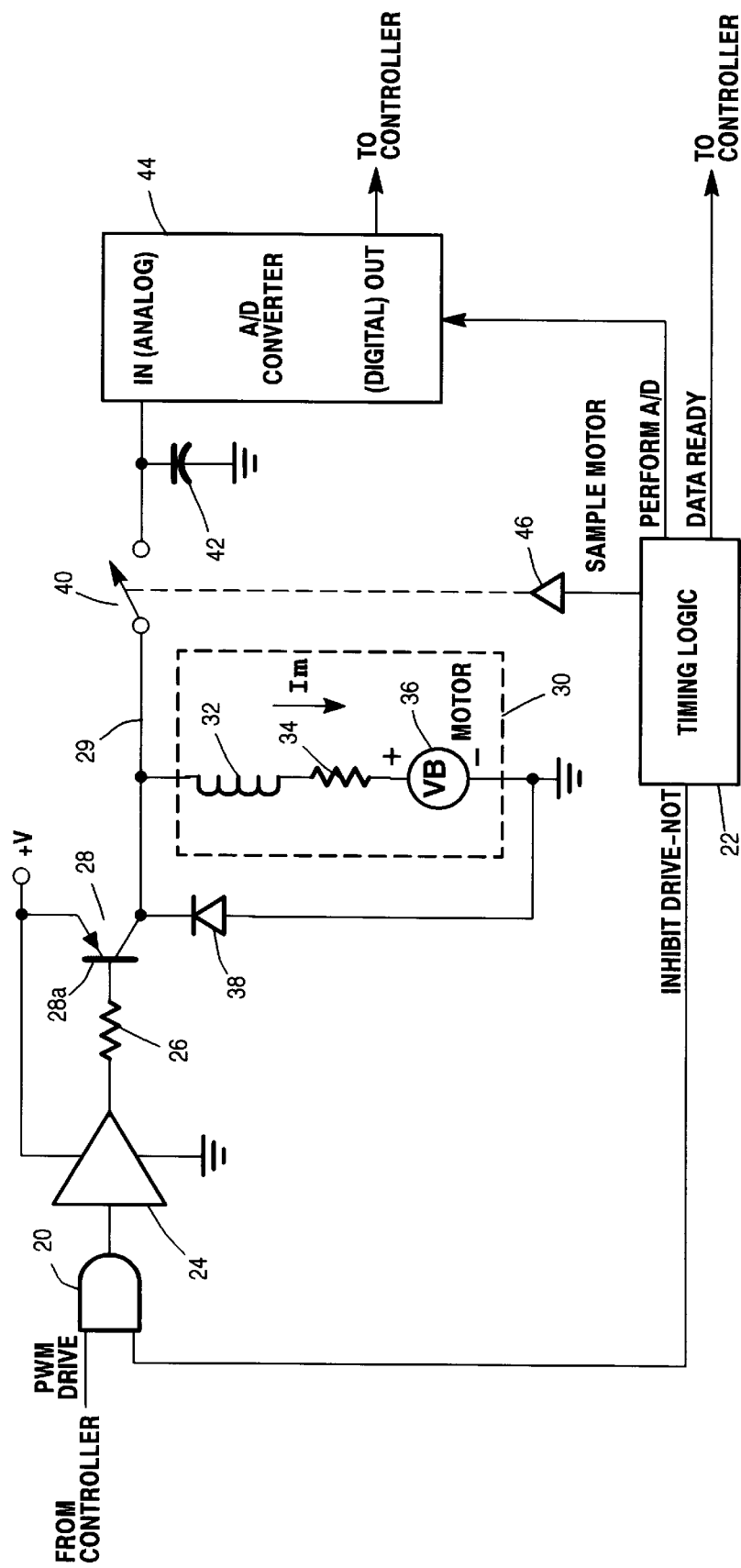
FIG. 1 shows a high-level functional block diagram of a PWM driven motor with a velocity feedback control system incorporating an embodiment of the present invention.
Figure 1A:
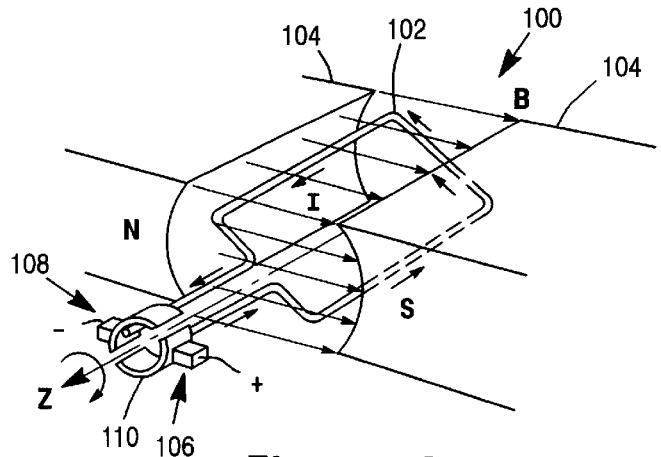
FIG. 1A is a simplified illustration of one example of a brush-commutated direct current motor that can be utilized in the system of FIG. 1.
Figure 1B:
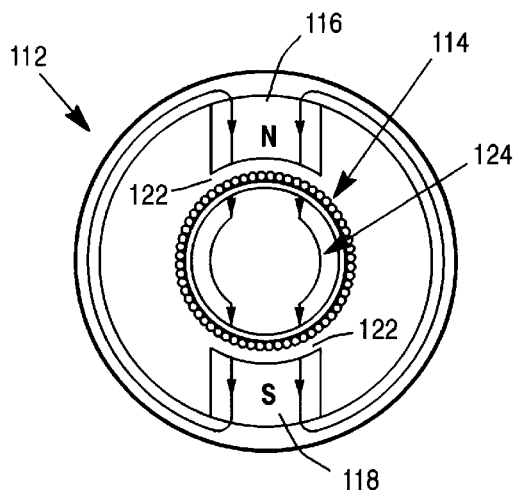
FIG. 1B is a more detailed cross-sectional view of another example of a brush-commutated direct current motor that can be utilized in the system of FIG. 1.
Figure 1C:
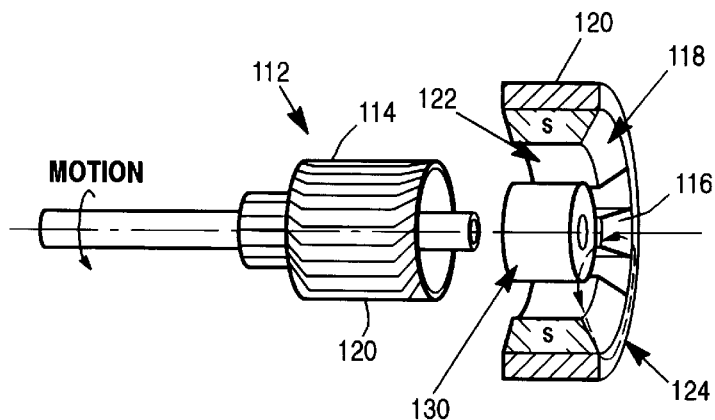
FIG. 1C is aan exploded side view of the motor of FIG. 1B with a portion cut away for easier viewing.

Examples of brush-type or brush-commutated D.C. motors are illustrated in the simplified view of FIG. 1A, and the more detailed views of FIGS. 1B and 1C. In FIG. 1A, motor 100 includes a rectangular loop of N turns 102 which is placed in a magnetic field produced by field magnet 104. D.C. current is applied to loop 102 of motor 100 via brushes 106 and 108. Brushes 106 and 108 slidably contact rotating commutator 110. Current applied to brushes 106 and 108 passes through loop 102 by way of rotating commutator 110. FIGS. 1B and 1C illustrate one example of a moving-coil permanent-magnet D.C. motor 112. Conductors 114 bonded together by non-magnetic materials are disposed between poles 116 and 118 of magnet 120. Conductors 114 are bonded together by non-magnetic materials to form the armature in the form of a hollow cylinder or hollow cup-shaped conductor array 120. An air gap 122 is left between armature 120 and poles 116, 118. The armature conductors 114 are placed in stationary flux return path 124. One end of armature 120 forms a hub 126, which is attached to motor shaft 128. Reference numeral 130 refers to a core about which array 120 is disposed when motor 112 is assembled; however, as can be seen in Fig. 1B, the core may not be needed for magnetic reasons.

The voltage may be applied to the motor in any conventional manner (e.g. PWM drive, linear drive, etc.) and three embodiments are described. The first is a unidirectional PWM driven system, the second is a bidirectional PWM driven system, and the third is a bidirectional linear driven system. It should be noted that these embodiments are for illustrative purposes and are not meant to limit the scope of the invention.

1. Unidirectional PWM Driven System

FIG. 1 shows a high-level functional block diagram of a brush-type motor with a velocity feedback control system incorporating an embodiment of the present invention. The drive for the system is a pulse-width modulated (PWM) signal generated by a digital controller. The digital controller, although not shown, is implemented in software for the described embodiment, and controls the duty cycle of the PWM drive signal. This signal is applied to one input of AND gate 20. The other input to AND gate 20 is the INHIBIT DRIVE-NOT signal generated by the timing logic 22. When the INHIBIT DRIVE-NOT signal is high, the PWM signal is allowed to pass through AND gate 20, however, when the INHIBIT DRIVE-NOT signal is low, the PWM signal is not allowed to pass through the AND gate 20. When enabled, the PWM signal passes through voltage level translation means 24, resistor 26 and is applied to the base 28a of transistor 28. The voltage level translation means 24 and resistor 26 are used to convert the digital voltage levels output from gate 20 to the levels necessary for motor operation.

The PWM signal will either turn transistor 28 on or off depending on its level. When the transistor is on, supply voltage +V is applied to the motor 30 by way of line 29. The exemplary embodiment of the present invention uses a value of +60 volts for +V. The motor 30, as indicated by the dotted lines, is shown in its equivalent circuit form as a series combination of an inductor (Lm) 32, resistor (Rm) 34, and a back EMF source (VB) 36. In the exemplary embodiment of the present invention, typical values for small motors of this type are:

Lm=5 millihenries,

Rm=2 ohms (including brush and external lead resistances), and

VB=44 volts per 1000 rpm.

Given these values, the electrical time constant (Lm/Rm) of motor 30 is 2.5 milliseconds. It should be noted that the electrical time constant is a key factor in determining the length of time that the drive signal is interrupted.

In parallel with motor 30 is a clamp diode 38 coupled between line 29 and ground. Also, coupled to line 29 is a normally open solid-state analog switch 40. Switch 40 leads to capacitor 42 which, in turn, supplies the analog input to the A/D converter 44 (in practice, buffer amplifiers and voltage followers are used to provide proper voltage levels and high impedances in the sampling circuitry, however, because these additions to this type of circuitry are well-known in the art, they have been omitted for the sake of clarity). The output of A/D converter 44 is supplied to the controller (not shown). Another input to the controller (not shown) is supplied by the timing logic 22, this signal, DATA READY, indicates to the controller that the data being supplied by the A/D converter 44 is valid. The timing logic 22 also instructs the A/D, via the PERFORM A/D line, when to convert its analog input. It also determines when switch 40 is opened or closed via the SAMPLE MOTOR line and translation means 46. Translation means 46 is used for converting signals with digital voltage levels—typically 0 to 5 volts—to the necessary analog levels for opening and closing the solid-state analog switch 40.

In operation, when the voltage applied to the motor is interrupted, either by the PWM signal or by the INHIBIT DRIVE-NOT signal, the inductance Lm prevents an instantaneous disappearance of current in motor 30. The current flow, Im, is maintained through clamp diode 38. The current decays exponentially toward a negative final value determined by the back EMF divided by the motor resistance (Rm) 34; however, when the current, Im, reaches zero the clamp diode 38 cuts off. Consequently, the current remains at zero and the voltage transitions to the back EMF (VB). Under normal operating conditions this process typically occurs in less than one electical time constant.

The significance and timing of this process will be explained by way of example. Assume that Rm equals 2 ohms, Lm equals 5 millihenries and VB equals 20 volts. These parameters yield an electrical time constant of 2.5 milliseconds. Also, assume the motor current, Im, which is flowing against the back EMF is 5 amps. To begin, the applied voltage is removed and the motor current, Im, begins to decrease. The motor current decreases toward a value determined by the back EMF divided by the motor resistance, Rm, which is 10 amps in the opposite direction (or −10 amps). The current change, given an infinite interrupt time, would be from +5 amps to−10 amps or a total of 15 amps. The significance of the electrical time constant is that in that period of time −2.5 milliseconds—the current will complete 63% of its change. Thus, if unimpeded by a clamping diode, the motor current, after one electrical time constant had elapsed, would be approximately −4.5 amps. However, in the exemplary embodiment of the present invention, the clamping diode 38 no longer conducts once the current reaches zero. Thus, waiting an interval equal to the electrical time constant ensures that the motor current has reached zero which is a necessary precedent to measurement of the back EMF.

Again, because the motor current reaches zero in less than one time constant, inhibiting the motor drive signal for a period of 2.5 milliseconds is sufficient for taking an accurate reading of the back EMF, VB.

Additionally, the mechanical inertia of the system (i.e., motor rotor and load) prevents any significant velocity change during the short interval required to sense the back EMF. It should be noted that the measurement of the back EMF draws a negligibly small amount of current.

FIG. 2 is a timing diagram which shows the waveforms created by the sequence of events which take place when it is desired to measure the back EMF. Note that for FIG. 2, it is assumed that the PWM drive signal has been present and is driving the motor at the low duty cycle shown (app. 25%). It is also assumed that the motor current, Im, of motor 30 is stabilized at an average value with superimposed rise and decay excursions.

At time T1, the INHIBIT DRIVE-NOT signal goes to a low state and shuts off the drive transistor. Consequently, as seen in the waveform for the motor voltage, the voltage aapplied to motor 30 is interrupted until INHIBIT DRIVE-NOT goes high. The inductive flyback voltage is clamped by clamp diode 38. The motor current, Im, begins its descent toward a negative value. When the motor current, Im, reaches zero, clamping diode 38 no longer conducts. At this point, the back EMF is the sole determinant of the motor voltage since no energy remains stored in the motor inductance, Lm. It should be noted that this lack of current flow through motor 30 during measurement of the back EMF guarantees an independence from variances in internal motor resistance, Rm.

At time T2, the analog switch 40 is turned on by the timing logic 22 via the SAMPLE MOTOR signal. Consequently, the back EMF, VB, is applied to the hold capacitor 42 which quickly charges to the back EMF voltage, VB. Capacitor 42 holds this value for subsequent analysis by A/D converter 44.

At time T3, three events occur in succession. First, the analog switch 40 is turned off (or opened); second, a request for conversion is sent to A/D converter 44 by the timing logic 22 via the PERFORM A/D signal; and, third, the INHIBIT DRIVE-NOT signal is returned to its high state, thus enabling the PWM drive signal.

At time T4, the conversion is completed by A/D converter 44 and the DATA READY signal is sent to the controller by the timing logic 22. The controller accepts the data (digital value of the back EMF which is proportional to the motor velocity) and compares the actual value with a value corresponding to the desired velocity. The desired velocity values are application specific as will be recognized by those skilled in the art.

In order to minimize the velocity error, the controller then makes the appropriate correction to the PWM duty cycle according to a predetermined algorithm. Examples of such algorithms may be found in the texts *Computer Controlled Systems Theory and Design* by Karl J. Astrom and Bjorn Wittenmark pulished by Prentice-Hall (1984) and *Automatic Control Systems*, 5th edition, by Benjamin C. Kuo published by Prentice-Hall (1987). It should be noted that there are many issues concerning the optimization of a control system to attain desired system performance, however, it will be understood by those skilled in the art that these issues are not relevant to the present invention because the present invention does not affect the design of such control systems.

In FIG. 2, it is assumed that the velocity of motor 30 at the 25% duty cycle was lower than the desired velocity, hence, the correction to the PWM drive signal results in an increased duty cycle (app. 50%) as seen from time T5 on.

At time T6, the process begins again and, as seen in the motor voltage waveform and as expected, the back EMF, VB, level has increased.

In the exemplary embodiment of the present invention, the inhibit interval is approximately 2.9 milliseconds. The voltage across the motor is allowed to stabilize for 2.5 milliseconds, then the sampling takes place during the last 0.4 milliseconds of the interval. The A/D converter in the exemplary embodiment performs the conversion in about 8 microseconds, thus, the data is available very soon after the request. Obviously, a much slower A/D converter could be used for the illustrated single-channel application, but the exemplary embodiment for the present invention is designed for an eight motor channel application where the A/D converter is time-multiplexed to handle all eight channels.

2. Bidirectional PWM Driven System

Although the above-description of the present invention discussed a simple unidirectional drive circuit, many systems require bidirectional operation. Such operation is commonly achieved using a PWM signal and a four-transistor "H" switch configuration which applies the proper voltage polarity to the motor. Four transistor "H" switches are well-known in the art for providing bidirectional drive to motors, thus a detailed description is not provided. A description of how a driver with the "H" switch circuitry operates can be found in the following references which are incorporated herein by reference: Goodenough, "Power IC Drives Motors From Logic-Level PWM", *Electronic Design* (Dec. 8, 1988); Sprague Integrated Circuits Data Book WR-504 (1987), UDN-2952B and UDN-2952W pg 4–64.

In a bidirectional embodiment, when the direction of the motor rotation is changed, the polarity of the back EMF reverses. This means that for a given velocity range, bidirectional operation requires twice the A/D converter resolution for a given accuracy. For instance, remembering that velocity is proportional to back EMF voltage, if in the unidirectional application the back EMF range is from 0 to +60 volts, in the bidirectional application the range is from −60 volts to 60 volts. Fortunately, in many cases, the direction of rotation is known on the basis of the applied drive polarity. In such cases, the full resolution capability of the A/D converter can be retained by rectifying the motor voltage to make the sensed polarity independent of direction.

Figure 3:
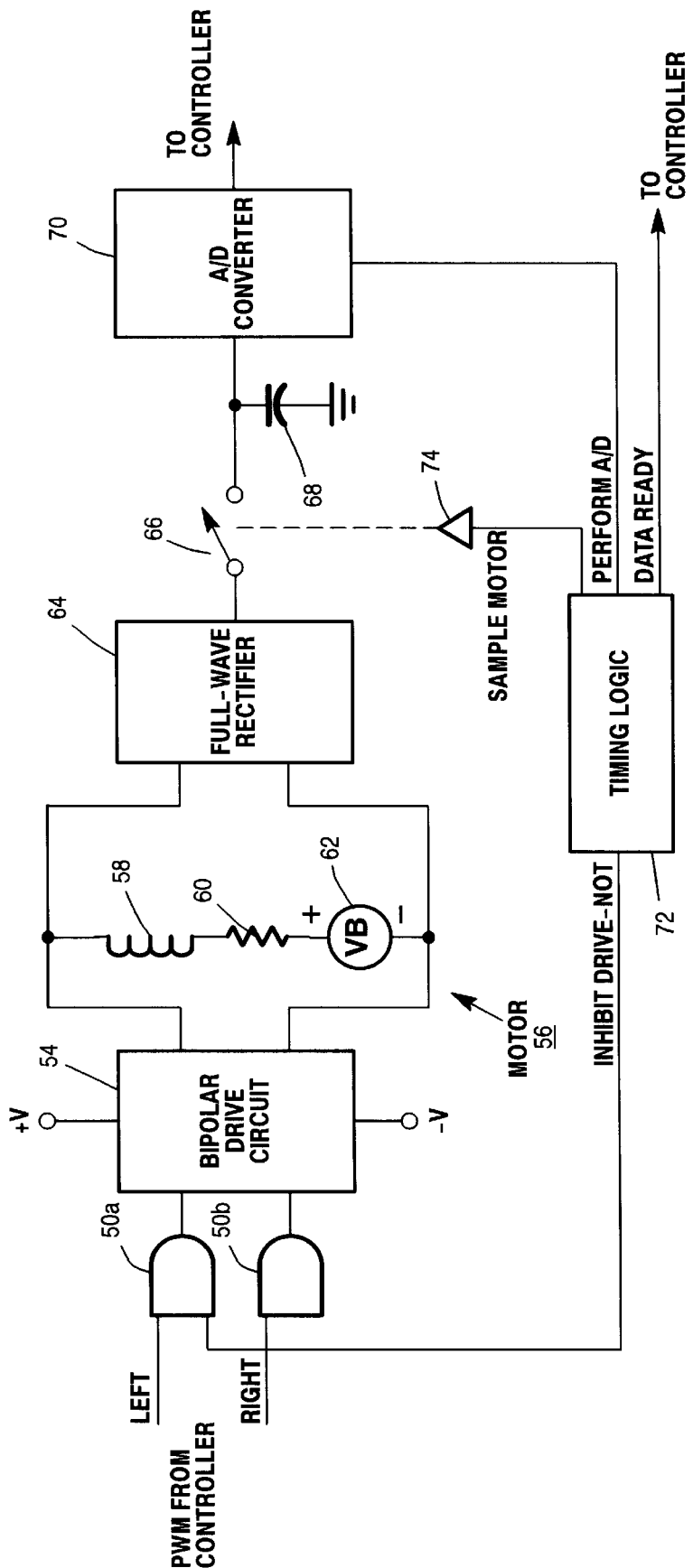
FIG. 3 shows FIG. 1 with a bidirectional drive circuit instead of a unidirectional drive circuit.

FIG. 3 shows the preferred embodiment of the bidirectional system incorporating the present invention. Because the operation of the system in FIG. 3 is so similar to the system in FIG. 1, only a brief description is provided. FIG. 3 is similar to FIG. 1 except that there is a bidirectional drive circuit 54 and a full-wave rectifier 64.

As seen, FIG. 3 includes the INHIBIT DRIVE-NOT signal supplied by the timing logic 72 and applied to AND gates 50a and 50b. The outputs of AND gates 50a and 50b are input to the bidirectional drive circuit 54 which includes a four-transistor "H" switch (not shown) for voltage polarity control.

The output of the bidirectional drive circuit 54 is applied across motor 56, the output of which is coupled to a full-wave rectifier 64. The output of the full-wave rectifier 64 is fed to the hold capacitor 68 via an analog switch 66 which is controlled by timing logic 72 via the SAMPLE MOTOR signal and voltage translation means 74. (It should be noted that a voltage scaling amplifier is used to scale the 60-volt motor voltage to the 6-volt range of the A/D converter 84 and the capacitor 68 is buffered by an operational amplifier which has an extremely high input impedance and does not degrade the capacitor charge).

The voltage across the capacitor 68 is input to the A/D converter 70. The timing sequence for the various functions of inhibiting drive, sampling and holding the back EMF, comparing the actual values against the desired values and adjusting the drive signal accordingly correspond to the waveforms shown in FIG. 2 (with the exceptions that the applied voltage has double the range—from +V to −V—and the motor voltage is rectified).

A/D converter 70 provides digital data which represents the back EMF, VB, which is directly proportional to the motor velocity. This data is sent to a controller (not shown) over a communications interface. The controller compares this measured value with a desired value, calculates the necessary PWM duty cycle for the next interval and, then, transmits the proper PWM drive signal. The PWM drive signal is applied to AND gate 50a (left) or AND gate 50b (right) depending on the direction of the rotation required. In either case, the PWM drive signal to the motor 56 is interrupted when the INHIBIT DRIVE-NOT signal (an input to both AND gates 50a and 50b) is in the low state, as required during a back EMF sample period.

3. Bidirectional Linear Driven System

As mentioned, the above described embodiments are systems which employ a PWM drive signal. Another method to control motor velocity is by means of a linear driven system. The present invention is not limited by the type of drive system used (e.g. PWM systems or linear systems), however, for further illustration and explanation, an exemplary embodiment of a bidirectional linear drive system is described.

Figure 4:
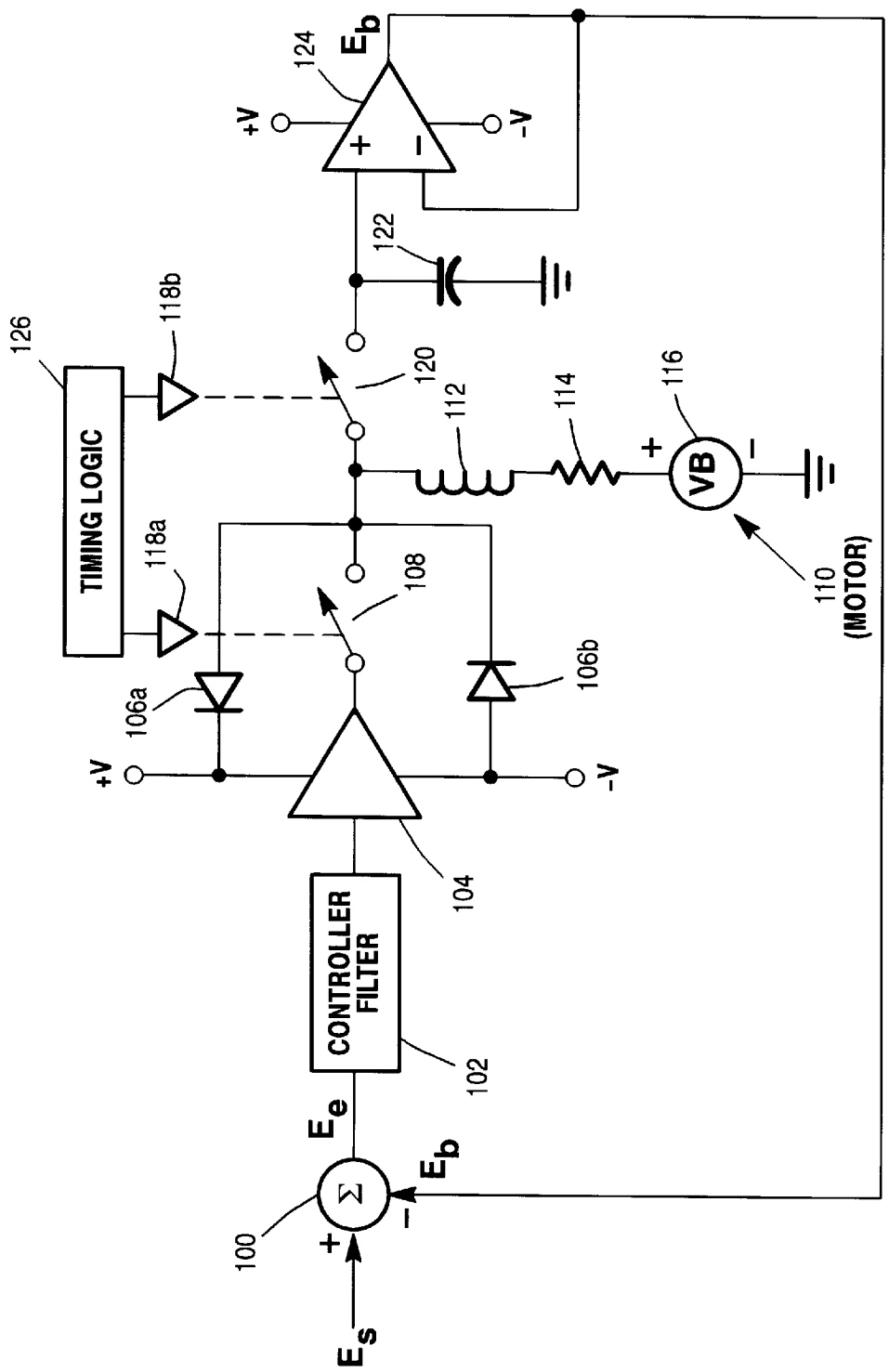
FIG. 4 shows a high-level functional block diagram of a linear driven motor with a velocity feedback control system incorporating an embodiment of the present invention.

FIG. 4 shows a high-level functional block diagram of a bidirectional linear driven D.C. motor with velocity feedback control incorporating an embodiment of the present invention.

FIG. 4 shows a set point voltage, Es, applied to the positive input of a summing junction 100. The negative input of summing junction 100 is supplied by the sampled back EMF, Eb, and the result is an error voltage, Ee. Essentially, the summing junction 118 compares the measured back EMF, Eb, to the desired voltage, Es. The error voltage, Ee, is applied to the input of the controller/filter 102. Controller 102 serves to achieve the desired system performance. The output of the controller 102 is fed to a power amplifier 104 which also accepts the positive and negative D.C. supplies, +V and −V. The D.C. supplies are coupled to clamping diodes 106a and 106b, respectively. The output of this circuitry passes through analog switch 108, if closed, and is applied to the motor 110 represented by its circuit equivalent—a series combination of an inductance (Lm) 112, a resistor (Rm), 114, and a voltage source (VB) 116 which is the back EMF.

In operation, when the back EMF, VB, is to be sampled, the analog switch 108 is opened. After allowing sufficient time for the inductive transient caused by Lm to decay via clamp diodes 106a and 106b, the analog switch 120 is closed and the back EMF voltage across the motor 110 is then captured by the hold circuitry represented by capacitor 122 and voltage follower 124.

The sampling of the back EMF is controlled by timing logic 126. The timing logic 126 of FIG. 4 corresponds to the timing logic 52 of FIG. 1. The voltage level of timing logic 126 is translated into a level necessary to control analog switches 108 and 120 by voltage translation means 118a and 118b. The voltage on capacitor 122 is buffered by the high input impedance voltage follower 124 and, as mentioned, applied to the negative input of summing junction 100 as Eb.

4. Limitations on the Inhibit Duration and Sample Rate

Using the sampled back EMF as the only feedback parameter in a velocity feedback control system for a brush-type D.C. motor is not without limitation. First, the sample interrupt duration (or minimum time for inhibiting the drive to the motor) has been shown to on the electrical time constant (Lm/Rm) of the motor being controlled. As previously stated, it is necessary for the motor current, Im, to reach zero before the back EMF is sampled. The value of the electrical time constant for a small motor, such as that used in the exemplary embodiments of the present invention, is typically on the order of 2 to 3 milliseconds.

The sampling rate (or time between samples) is governed by two conflicting factors. First, since the motor is not developing torque after the motor current, Im, reaches zero and does not reach full torque immediately after restoration of the PWM drive signal, the effective percent of maximum torque which can be achieved is approximately equal to the ratio of inhibit time to sample repetition time. Thus, the interval between samples must be of sufficient duration to allow the required torque to develop for the given application.

Second, the maximum allowable time between samples is dictated by the open loop bandwidth of the system being controlled. Ideally, the time should be zero. However, the mechanical inertia of the system generally prevents significant velocity changes from occurring in much less than tens of milliseconds. The maximum time between samples must be short compared to the electromechanical decay time.

The simultaneous satisfaction of these two factors requires that the electrical time constant of the system be relatively small compared to the electromechanical time constant of the system (approximately given by the product of motor resistance and system inertia expressed as an equivalent capacitance).

In a loop using direct sampling of the back EMF, the effective electrical bandwidth is defined by the sampling theorem, which states that the control loop bandwidth can be at most one-half the sample rate. For example, a rate of 100 samples/second equates to a 50 hertz loop bandwidth. If the electromechanical time constant is 100 milliseconds (corresponding to a cutoff frequency of 1.6 hertz), the bandwidth ratio is in excess of 30:1 and excellent control is possible. Note that in the exemplary embodiment of the present invention, considerably lower ratios have been found to yield satisfactory results.

In the exemplary embodiment of the present invention, an effective duty cycle of approximately 75% (meaning the PWM drive signal is enabled ¾ of the time and inhibited ¼ of the time) is adequate. Given an approximate sample period of 2.9 milliseconds, the sample rate time is set at approximately 12.5 milliseconds.

In the exemplary embodiment of the present invention some of the actual devices used are as follows: LMC660CN (National Semiconductor: op amp), AD7870KN (Analog Devices: A/D converter), 74HCT4316 (analog switch). The controller for the exemplary embodiment of the present invention was implemented in software. The control function U[n] was updated using the following equation:

$$U[n] = U[n-1] + K(e[n] - z1 * e[n-1])$$

where e[n] is the discrete time error function, K is the gain and z1 is a zero of the controller. This is a simple form of a proportional integral (PI) controller.

It should be noted that the present invention is particularly useful in the Small Parcel and Bundle Sorter (SPBS) system which employs carrier cell technology as described in the SPBS Executive Summary, Paramax Corp. (December 1991) which is herein incorporated by reference.

Although the invention is illustrated and described herein embodied as a unidirectional or bidirectional PWM drive or a bidirectional linear drive motor velocity control system, the invention is nevertheless not intended to be limited to the details shown. Rather, various modifications may be made in the details within the scope and range of equivalents of the claims and without departing from the spirit of the invention.

What is claimed:

1. A system for controlling the velocity of a brush-commutated D.C. motor, comprising:

adjustable voltage means for applying a first voltage across said D.C. motor;

means for inhibiting the first voltage applied across the D.C. motor, where the duration of said inhibition is constant and predetermined as a function of an electrical time constant of the D.C. motor expressed as L/R, where L is an inductance of the D.C. motor and R is a resistance of the D.C. motor, the duration of the inhibition being selected to be sufficiently long so that a motor current decays to substantially zero, and said inhibition is set to repeat at a predetermined, constant rate that is chosen to maximize available torque while maintaining a desired accuracy of motor speed control;

means for sampling and holding a voltage amplitude value proportional to a second voltage across said D.C. motor during each time interval that said first voltage is inhibited, and after the motor current decays to substantially zero;

means for comparing the second voltage with a value representing a desired velocity; and means for controlling, in real-time, the adjustable voltage means only in response to the comparing means to adjust the first voltage to a value relating to the desired velocity.

2. Apparatus as defined in claim 1 wherein said means for sampling and holding comprises means for sampling and holding the voltage amplitude value during each time interval that said first voltage is inhibited but after a sufficient delay from commencement of the inhibition to permit decay of motor current to substantially zero and to permit the second voltage across said D.C. motor to reach a steady-state level, wherein the delay is less than the time interval that said first voltage is inhibited.

3. Apparatus as defined in claim 2 wherein each of the inhibitions is sufficiently short to avoid causing any substantial motor velocity change, but is sufficiently long that the second voltage reaches a steady-state magnitude and can be sensed.

4. Apparatus as defined in claim 3, further comprising means for dissipating, during the inhibition interval, energy stored in the motor inductance.

5. Apparatus as defined in claim 4 wherein the inhibitions of the first applied voltage are separated by a time interval that is sufficiently long, relative to the duration of said inhibitions, to allow sufficient energy to be imparted to the motor, by the adjustable voltage means, for operation of the motor.

6. A method for controlling the velocity of a brush-commutated D.C. motor, comprising the steps of:

applying an adjustable drive voltage to the D.C. motor;

inhibiting the adjustable drive voltage, where the duration of said inhibition is constant and predetermined as a function of an electrical time constant of the motor expressed as L/R, where L is an inductance of the D.C. motor and R is a resistance of the D.C. motor, the duration of the inhibition being selected to be sufficiently long so that a motor current decays to substantially zero, and said inhibition is set to repeat at a predetermined, constant rate that is chosen to maximize available torque while maintaining a desired accuracy of motor speed control;

sampling and storing during each said regularly repeated inhibit time interval a value proportional to an amplitude of a voltage across the D.C. motor, and after the motor current decays to substantially zero;

comparing the stored value with a predetermined desired value; and controlling the magnitude of the adjustable drive voltage only in response to the comparison of the stored value and the desired value.

7. A method as defined in claim 6 wherein said step of sampling and storing comprises sampling and storing a voltage proportional to the magnitude of the back emf during each inhibit time interval but after sufficient delay from commencement of the inhibit interval to permit decay of motor current to substantially zero and to permit the voltage across the D.C. motor to reach a steady-state level, wherein the delay is less than the inhibit time interval.

8. A method as defined in claim 7 wherein the inhibit time interval is sufficiently short to avoid causing any substantial motor velocity change, but is sufficiently long that the voltage across the D.C. motor reaches a steady-state magnitude and can be sensed.

9. A method as defined in claim 8, further comprising the step of dissipating, during the inhibition, energy stored in the motor inductance.

10. A method as defined in claim 9 wherein successive said steps of sampling and holding are separated by a time interval that is sufficiently long relative to the inhibit duration to allow sufficient energy to be imparted to the D.C. motor by said applying step, for operation of the motor.

11. A system for controlling the rotational velocity of a brush-type, direct-current motor, wherein the stator of the motor produces a stationary magnetic field, and the rotor of the motor contains one or more windings which terminate in a rotating commutator, the commutator being contacted by conductive brushes connected to a unidirectional current source, the commutator being arranged to supply current to the windings in a manner which causes rotation of the rotor, comprising:

(a) adjustable voltage means for applying voltage across the rotor windings of the D.C. motor wherein said adjustable voltage means is sufficient to cause rotation of the rotor of the motor;

(b) means for inhibiting said adjustable voltage means, where the duration of said inhibition is constant and predetermined as a function of an electrical time constant of the D.C. motor expressed as L/R, where L is an inductance of the D.C. motor and R is a resistance of the D.C. motor, the duration of the inhibition being selected to be sufficiently long so that a motor current decays to substantially zero, and said inhibition is set to repeat at a predetermined, constant rate that is chosen to maximize available torque while maintaining a desired accuracy of motor speed control, thus inhibiting the voltage applied to the rotor windings of the D.C. motor where the duration of each such inhibition is such that the impact to the rotor velocity, of said D.C. motor, is negligible;

(c) a back emf magnitude detector, comprised of a means for sampling and holding a voltage value proportional to the voltage detected across the rotor windings of the D.C. motor during each inhibition of said adjustable voltage means, and after the motor current decays to substantially zero;

(d) means for comparing the voltage representing the magnitude of the sampled back emf, and thus representing the actual rotor velocity of the D.C. motor, with a value representing a desired rotor velocity to produce a velocity error signal; and (e) means for controlling, in real-time, said adjustable voltage means, in response to the velocity error signal, to adjust the voltage applied across the rotor windings of the D.C. motor to minimize the velocity error signal and achieve the desired rotor velocity of the D.C. motor.

12. A system as defined in claim 11 wherein said means for sampling and holding comprises means for sampling and holding the voltage value during each inhibition such that said adjustable voltage means is inhibited by said inhibiting means but after a sufficient delay from commencement of the inhibition to permit the voltage across the rotor windings to reach a steady-state level, wherein the delay is less than the inhibit duration.

13. A system as defined in claim 12 wherein the inhibition duration is sufficiently short to avoid causing any substantial motor velocity change, but is sufficiently long such that the voltage across the rotor windings reaches a steady-state magnitude and can be sensed.

14. A system as defined in claim 13, further comprising means for dissipating, during the inhibition, energy stored in the motor inductance.

15. A system as defined in claim 14 wherein the inhibitions are separated by a time interval that is sufficiently long, relative to the duration of said inhibitions, to allow sufficient energy to be imparted to the motor, by said adjustable voltage means, for operation of the motor.

16. A method for controlling the rotational velocity of a brush-type, direct-current motor, wherein the stator of the motor produces a stationary magnetic field, and the rotor of the motor contains one or more windings which terminate in a rotating commutator, the commutator being contacted by conductive brushes connected to a unidirectional current source, the commutator being arranged to supply current to the windings in a manner which causes rotation of the rotor, comprising the steps of:

(a) applying an adjustable voltage across the rotor windings of the D.C. motor wherein the adjustable voltage is sufficient to cause rotation of the rotor of the D.C. motor;

(b) inhibiting the adjustable voltage where the duration of said inhibition is constant and predetermined as a function of an electrical time constant of the D.C. motor expressed as L/R, where L is an inductance of the D.C. motor and R is a resistance of the D.C. motor, the duration of the inhibition being selected to be sufficiently long so that a motor current decays to substantially zero, and said inhibition is set to repeat at a predetermined, constant rate that is chosen to maximize available torque while maintaining a desired accuracy of motor speed control, thus inhibiting the voltage applied to the rotor windings of the D.C. motor, where the duration of each inhibition is such that the impact to the rotor velocity, of the D.C. motor, is negligible;

(c) sampling and holding the magnitude of the back emf voltage detected across the rotor windings of the D.C. motor during each said inhibition such that the adjustable voltage is inhibited by said inhibiting step, and after the motor current decays to substantially zero;

(d) comparing the stored, sampled voltage representing the magnitude of the sampled back emf, and thus representing the actual rotor velocity of the D.C. motor, with a value representing a desired rotor velocity to produce a rotor velocity error signal; and (e) controlling, in real-time, the adjustable voltage, in response to the rotor velocity error signal, to adjust the voltage applied across the rotor windings of the D.C. motor to minimize the velocity error signal and achieve the desired rotor velocity of the D.C. motor.

17. Apparatus for controlling angular velocity of a brush-commutated direct current motor operated by a single adjustable electric input, said apparatus comprising:

means for inhibiting application of the adjustable electric input where the duration of said inhibition is constant and predetermined as a function of an electrical time constant of the D.C. motor expressed as L/R, where L is an inductance of the D.C. motor and R is a resistance of the D.C. motor, the duration of the inhibition being selected to be sufficiently long so that a motor current decays to substantially zero, and said inhibition is set to repeat at a predetermined, constant rate that is chosen to maximize available torque while maintaining a desired accuracy of motor speed control;

means for sampling and holding the magnitude of the back emf of the motor during each said inhibition and after a sufficient delay from commencement of the said inhibition to permit decay of motor current to substantially zero and to permit the back emf to reach a steady-state level, wherein the delay is less than the predetermined duration of the inhibition;

means for comparing the sampled and held back emf magnitude with a preset fixed value; and means for adjusting a magnitude of the single electric input proportional to any difference found by said comparing means between the sampled and held back emf magnitude and the preset fixed value.

18. Apparatus as defined in claim 17 wherein the duration of inhibition is sufficiently short to avoid causing any substantial motor velocity change, but is sufficiently long that the back emf reaches a steady-state magnitude and can be sensed.

19. Apparatus as defined in claim 18, further comprising means for dissipating, during the inhibition, energy stored in the motor inductance.

20. Apparatus as defined in claim 19 wherein the inhibitions are separated by a time interval that is sufficiently long, relative to the time duration of any of the inhibitions, to allow sufficient energy to be imparted to the motor, by the single adjustable electric input, for operation of the motor.

21. A method for controlling angular velocity of a brush-commutated direct current motor operated by a single adjustable electric input, said method comprising the steps of:

inhibiting application of the adjustable electric input where the duration of said inhibition is constant and predetermined as a function of an electrical time constant of the D.C. motor expressed as L/R, where L is an inductance of the D.C. motor and R is a resistance of the D.C. motor, the duration of the inhibition being selected to be sufficiently long so that a motor current decays to substantially zero, and inhibition is set to repeat at a predetermined, constant rate that is chosen to maximize available torque while maintaining a desired accuracy of motor speed control;

sampling and holding the magnitude of the back emf of the motor during the inhibition but after a sufficient delay from commencement of the inhibition to permit decay of motor current to substantially zero and to permit the back emf to reach a steady-state level, wherein the delay is less than the predetermined duration of the inhibition;

comparing the sampled and held back emf magnitude with a preset fixed value; and adjusting a magnitude of the single electric input proportional to any difference found by said comparing step between the sampled and held back emf magnitude and the preset fixed value.

22. A method as defined in claim 21, wherein the duration of inhibition is sufficiently short to avoid causing any substantial motor velocity change, but is sufficiently long that the back emf reaches a steady-state magnitude and can be sensed.

23. A method as defined in claim 22, further comprising the step of dissipating, during the inhibition, energy stored in the motor inductance.

24. A method as defined in claim 23 wherein successive said inhibiting steps are separated by a time interval that is sufficiently long, relative to the predetermined time duration of said inhibiting step, to allow sufficient energy to be imparted to the motor, by the single adjustable electric input, for operation of the motor.

25. A method as defined in claim 21 wherein the inhibition is a temporary, brief interruption of the applied voltage.

26. A method as defined in claim 21, further comprising repeating said inhibiting, sampling and holding, comparing and adjusting steps.

27. A method as defined in claim 21 wherein:

said inhibiting step comprises removing a voltage; and said step of sampling and holding the back emf comprises sampling and holding the back emf upon each removal of the applied voltage.

28. A system for controlling the velocity of a brush-commutated D.C. motor, comprising:

adjustable voltage means for applying a first voltage across said D.C. motor;

means for periodically inhibiting, for regularly repeated time intervals of predetermined duration, the first voltage applied across the D.C. motor, where the duration of each inhibition is constant and predetermined as a function of an electrical time constant of the D.C. motor expressed as L/R, where L is an inductance of the D.C. motor and R is a resistance of the D.C. motor and where the duration of the inhibition is selected to be sufficiently long so that a motor current decays to substantially zero, and where the inhibition of the first voltage is set to repeat at a predetermined, constant rate that is chosen to maximize available torque while maintaining a desired accuracy of motor speed control;

means for sampling and holding a voltage amplitude value proportional to a second voltage across said D.C. motor during each time interval that said first voltage is inhibited, and after the motor current decays to substantially zero;

means for comparing the second voltage with a value representing a desired velocity; and means for controlling, in real-time, the adjustable voltage means only in response to the comparing means to adjust the first voltage to a value relating to the desired velocity.

29. A method for controlling the velocity of a brush-commutated D.C. motor, comprising the steps of:

applying an adjustable drive voltage to the D.C. motor;

periodically inhibiting, for a regularly repeated time interval of predetermined duration, the adjustable drive voltage, where the duration of each inhibition is constant and predetermined as a function of an electrical time constant of the D.C. motor expressed as L/R, where L is an inductance of the D.C. motor and R is a resistance of the D.C. motor, and where the duration of the inhibition is selected to be sufficiently long so that a motor current decays to substantially zero, and where the inhibition of the drive voltage is set to repeat at a predetermined, constant rate that is chosen to maximize available torque while maintaining a desired accuracy of motor speed control;

sampling and storing during each said regularly repeated inhibit time interval a value proportional to amplitude of a voltage across the D.C. motor, and after the motor current decays to substantially zero;

comparing the stored value with a predetermined desired value; and controlling the magnitude of the adjustable drive voltage only in response to the comparison of the stored value and the desired value.

30. A system for controlling the rotational velocity of a brush-type, direct-current motor, wherein the stator of the motor produces a stationary magnetic field, and the rotor of the motor contains one or more windings which terminate in a rotating commutator, the commutator being contacted by conductive brushes connected to a unidirectional current source, the commutator being arranged to supply current to the windings in a manner which causes rotation of the rotor, comprising:

(a) adjustable voltage means for applying voltage across the rotor windings of the D.C. motor wherein said adjustable voltage means is sufficient to cause rotation of the rotor of the motor;

(b) means for periodically inhibiting said adjustable voltage means at preset time intervals of predetermined duration, thus inhibiting the voltage applied to the rotor windings of the D.C. motor for each such time interval where the duration of each such interval of inhibition is such that the impact to the rotor velocity, of said D.C. motor, is negligible, and where the duration of each inhibition is constant and predetermined as a function of an electrical time constant of the D.C. motor expressed as L/R, where L is an inductance of the D.C. motor and R is a resistance of the D.C. motor, where the duration of the inhibition is selected to be sufficiently long so that a motor current decays to substantially zero, and where the inhibition of the voltage is set to repeat at a predetermined, constant rate that is chosen to maximize available torque while maintaining a desired accuracy of motor speed control;

(c) a back emf magnitude detector, comprised of a means for sampling and holding a voltage value proportional to the voltage detected across the rotor windings of the D.C. motor during each time interval that said adjustable voltage means is inhibited by said inhibiting means, and after the motor current decays to substantially zero;

(d) means for comparing the voltage representing the magnitude of the sampled back emf, and thus representing the actual rotor velocity of the D.C. motor, with a value representing a desired rotor velocity to produce a velocity error signal; and (e) means for controlling, in real-time, said adjustable voltage means, in response to the velocity error signal, to adjust the voltage applied across the rotor windings of the D.C. motor to minimize the velocity error signal and achieve the desired rotor velocity of the D.C. motor.

31. A method for controlling the rotational velocity of a brush-type, direct-current motor, wherein the stator of the motor produces a stationary magnetic field, and the rotor of the motor contains one or more windings which terminate in a rotating commutator, the commutator being contacted by conductive brushes connected to a unidirectional current source, the commutator being arranged to supply current to the windings in a manner which causes rotation of the rotor, comprising the steps of:

(a) applying an adjustable voltage across the rotor windings of the D.C. motor wherein the adjustable voltage is sufficient to cause rotation of the rotor of the D.C. motor;

(b) periodically inhibiting the adjustable voltage for regularly repeated time intervals of predetermined duration, thus inhibiting the voltage applied to the rotor windings of the D.C. motor for each such time interval where the duration of each such time interval is such that the impact to the rotor velocity, of the D.C. motor, is negligible, and where the duration of each inhibition is constant and predetermined as a function of an electrical time constant of the D.C. motor expressed as L/R, where L is an inductance of the D.C. motor and R is a resistance of the D.C. motor, where the duration of the inhibition is selected to be sufficiently long so that a motor current decays to substantially zero, and where the inhibition of the adjustable voltage is set to repeat at a predetermined, constant rate that is chosen to maximize available torque while maintaining a desired accuracy of motor speed control;

(c) sampling and holding the magnitude of the back emf voltage detected across the rotor windings of the D.C. motor during each said time interval that the adjustable voltage is inhibited by said inhibiting step, and after the motor current decays to substantially zero;

(d) comparing the stored, sampled voltage representing the magnitude of the sampled back emf, and thus representing the actual rotor velocity of the D.C. motor, with a value representing a desired rotor velocity to produce a rotor velocity error signal; and (e) controlling, in real-time, the adjustable voltage, in response to the rotor velocity error signal, to adjust the voltage applied across the rotor windings of the D.C. motor to minimize the velocity error signal and achieve the desired rotor velocity of the D.C. motor.

32. Apparatus for controlling angular velocity of a brush-commutated direct current motor operated by a single adjustable electric input, said apparatus comprising:

means for periodically interrupting application of the adjustable electric input for a regularly repeated interval of a predetermined time duration, where the duration of each interruption is constant and predetermined as a function of an electrical time constant of the D.C. motor expressed as L/R, where L is an inductance of the D.C. motor and R is a resistance of the D.C. motor, where the duration of the interruption is selected to be sufficiently long so that a motor current decays to substantially zero, and where the interruption of the adjustable electric input is set to repeat at a predetermined, constant rate that is chosen to maximize available torque while maintaining a desired accuracy of motor speed control;

means for sampling and holding the magnitude of the back emf of the motor during each said interval but after a sufficient delay from commencement of the interval to permit decay of motor current to substantially zero and to permit the back emf to reach a steady-state level, wherein the delay is less than the predetermined time duration;

means for comparing the sampled and held back emf magnitude with a preset fixed value; and means for adjusting a magnitude of the single electric input proportional to any difference found by said comparing means between the sampled and held back emf magnitude and the preset fixed value.

33. A method for controlling angular velocity of a brush-commutated direct current motor operated by a single adjustable electric input, said method comprising the steps of:

periodically interrupting application of the adjustable electric input for a regularly repeated interval of a predetermined time duration, where the duration of each interruption is constant and predetermined as a function of an electrical time constant of the D.C. motor expressed as L/R, where L is an inductance of the D.C. motor and R is a resistance of the D.C. motor, where the duration of the interruption is selected to be sufficiently long so that a motor current decays to substantially zero, and where the interruption of the adjustable electric input is set to repeat at a predetermined, constant rate that is chosen to maximize available torque while maintaining a desired accuracy of motor speed control;

sampling and holding the magnitude of the back emf of the motor during the interval but after a sufficient delay from commencement of the interval to permit decay of motor current to substantially zero and to permit the back emf to reach a steady-state level, wherein the delay is less than the predetermined time duration;

comparing the sampled and held back emf magnitude with a preset fixed value; and adjusting a magnitude of the single electric input proportional to any difference found by said comparing step between the sampled and held back emf magnitude and the preset fixed value.

34. A method for controlling an angular velocity of a brush-commutated direct current (D.C.) motor that is operated by a pulse width modulated (PWM) train of electric drive pulses, said method comprising the steps of:

continuously generating PWM electric drive pulses for application to the D.C. motor;

periodically asserting a constant pulse width signal to interrupt the application of the PWM train of electric drive pulses to the D.C. motor for a predetermined interval of time, where the duration of each interruption is the same and is predetermined as a function of an electrical time constant of the D.C. motor expressed as L/R, where L is an inductance of the D.C. motor and R is a resistance of the D.C. motor, where the duration of the interruption is selected to be sufficiently long so that a motor current decays to substantially zero, and where the interruption of the adjustable electric input is set to repeat at a predetermined, constant rate that is chosen to maximize available torque while maintaining a desired accuracy of motor speed control, and where a plurality of the PWM electric drive pulses are applied to the motor between assertions of the constant pulse width signal;

during each interruption of the PWM train of electric drive pulses, waiting for the motor current to decay to substantially zero and then sampling and holding a magnitude of the back emf of the motor;

deasserting the constant pulse width signal, thereby terminating the interruption of the PWM train of electric drive pulses;

comparing the sampled and held back emf magnitude with a reference value that is indicative of a desired angular velocity of the D.C. motor; and adjusting the pulse width of the PWM train of electric drive pulses by an amount that is proportional to any difference found by said comparing step between the sampled and held back emf magnitude and the reference value.

* * * * *